United States Patent
Park et al.

(10) Patent No.: US 9,940,921 B2
(45) Date of Patent: Apr. 10, 2018

(54) VEHICLE, VEHICLE CONTROL METHOD AND VEHICLE DRIVING SOUND CONTROL APPARATUS

(71) Applicant: Hyundai Motor Company, Seoul (KR)

(72) Inventors: Dong Chul Park, Gyeonggi-do (KR);
Sang Il Lee, Gyeonggi-do (KR);
Dongwook Lee, Gyeonggi-do (KR);
Seonghyeon Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/562,670

(22) Filed: Dec. 6, 2014

(65) Prior Publication Data
US 2015/0364125 A1  Dec. 17, 2015

(30) Foreign Application Priority Data

Jun. 11, 2014 (KR) ........................ 10-2014-0070835

(51) Int. Cl.
*G06F 19/00* (2011.01)
*G10K 15/02* (2006.01)
*B60Q 5/00* (2006.01)

(52) U.S. Cl.
CPC ............. *G10K 15/02* (2013.01); *B60Q 5/008* (2013.01)

(58) Field of Classification Search
CPC ...................................... G10K 11/18
USPC ........................................... 701/36
See application file for complete search history.

(56) References Cited

U.S. PATENT DOCUMENTS

| | | | | |
|---|---|---|---|---|
| 5,635,903 A * | 6/1997 | Koike | ............... | A63H 17/34 340/384.1 |
| 5,835,605 A * | 11/1998 | Kunimoto | ............... | G10K 15/02 381/61 |
| 6,356,185 B1 * | 3/2002 | Plugge | ............... | G10H 1/00 340/384.3 |
| 6,725,150 B1 * | 4/2004 | Glandian | ............... | G10K 15/02 381/61 |
| 6,751,534 B2 * | 6/2004 | Robichaux | ............... | B60L 11/14 180/65.1 |
| 6,959,094 B1 * | 10/2005 | Cascone | ............... | G10K 15/02 381/61 |

(Continued)

FOREIGN PATENT DOCUMENTS

| | | |
|---|---|---|
| JP | 2006-001524 A | 1/2006 |
| JP | 2007-264125 A | 10/2007 |

(Continued)

OTHER PUBLICATIONS

Korean Office Action for Korean Patent Application No. 10-2014-0070835, English translation, 15 pages.

*Primary Examiner* — Bhavesh V Amin
(74) *Attorney, Agent, or Firm* — Mintz Levin Cohn Ferris Glovsky and Popeo, P.C.; Peter F. Corless (57) ABSTRACT

A vehicle, a vehicle control method, and a vehicle driving sound control apparatus in which a user may freely generate a requested vehicle driving sound using a user terminal and generate an additional driving sound more similar to an actual vehicle driving sound by vibrating a structure of a vehicle using an exciter are provided. The vehicle includes a controller configured to receive vehicle driving sound parameters requested by a user from a user terminal and an exciter configured to vibrate a structure of a vehicle based on the vehicle driving sound parameters.

23 Claims, 9 Drawing Sheets

(56) References Cited

U.S. PATENT DOCUMENTS

| | | | | |
|---|---|---|---|---|
| 7,088,829 B1* | 8/2006 | Schick | B60Q 5/00 381/61 |
| 7,650,001 B2* | 1/2010 | Yasushi | B60Q 5/008 381/61 |
| 7,764,800 B2* | 7/2010 | Maeda | H04R 5/04 381/61 |
| 7,787,633 B2* | 8/2010 | Costello | G09B 9/02 340/384.3 |
| 8,009,839 B2* | 8/2011 | Hagen | H04R 5/02 381/161 |
| 8,138,897 B2* | 3/2012 | Leyerle | B60Q 5/008 340/425.5 |
| 8,179,234 B1* | 5/2012 | Atwood | B60Q 5/008 340/384.1 |
| 8,300,844 B2* | 10/2012 | Casey | G10K 15/02 381/61 |
| 8,331,580 B2* | 12/2012 | Isozaki | B60L 3/00 340/441 |
| 8,499,744 B2* | 8/2013 | Fujikawa | F02D 11/106 123/399 |
| 8,581,714 B2* | 11/2013 | Yu | B60Q 9/008 303/151 |
| 2002/0141597 A1* | 10/2002 | Wilcock | G06F 3/167 381/61 |
| 2003/0220722 A1* | 11/2003 | Toba | G10K 15/02 701/1 |
| 2004/0225425 A1* | 11/2004 | Kindo | G08G 1/0969 701/36 |
| 2009/0066499 A1* | 3/2009 | Bai | G10K 15/04 340/459 |
| 2010/0089307 A1* | 4/2010 | Kenchington | G10K 15/02 116/28 R |
| 2013/0134730 A1* | 5/2013 | Ricci | G06F 9/54 296/24.34 |

FOREIGN PATENT DOCUMENTS

| | | |
|---|---|---|
| JP | 2011-152856 A | 8/2011 |
| JP | 2013-167851 A | 8/2013 |
| KR | 20130054031 A | 5/2013 |
| KR | 10-2014-0014717 A | 2/2014 |
| KR | 2014-0031653 A | 3/2014 |

* cited by examiner

VEHICLE, VEHICLE CONTROL METHOD AND VEHICLE DRIVING SOUND CONTROL APPARATUS

CROSS-REFERENCE TO RELATED APPLICATION

This application claims priority to Korean Patent Application No. 10-2014-0070835, filed on Jun. 11, 2014, the disclosure of which is incorporated herein by reference.

BACKGROUND

Technical Field

The present invention relates to control of the driving sound of a vehicle and a vehicle having the same.

Description of the Related Art

Vehicle noise may lower driver concentration while operating the vehicle and cause unpleasant environments within the vehicle. However, the noise of the vehicle is an important factor that allows the driver to sense a propulsive force and mobility of the vehicle and provides dynamics of the vehicle.

Accordingly, when an electric vehicle does not generate vehicle noise and vibration, apparatuses that artificially generate and provide vehicle noise based on a driver preferences and taste has been proposed. Some vehicle enthusiasts spend a substantial amount of time and money to achieve a specific engine sound for a particular model of a vehicle.

SUMMARY

The present invention provides a vehicle, a vehicle control method, and a vehicle driving sound control apparatus that may allow a user to generate a desired vehicle driving sound using a user terminal and a vibration of a structure of a vehicle that uses exciters to mimic the noises of a vehicle.

According to an exemplary embodiment of the present invention, a vehicle may include a controller configured to receive vehicle driving sound parameters requested by a user from a user terminal and an exciter configured to vibrate a structure of a vehicle based on the vehicle driving sound parameters. The structure vibrated by the exciter may be a structure disposed within a front part of a passenger compartment of the vehicle and may include a cowl panel. Further, the structure may include a windshield at a front side of the passenger compartment.

The vehicle driving sound parameters requested by the user may be set using the user terminal. The vehicle driving sound parameters may include at least one selected from the group consisting of: a volume and a tone of the vehicle driving sound and an accelerator pedal reactivity. The setting of the volume may include at least one selected from the group consisting of: setting a master volume, setting a volume based on an accelerator pedal reactivity, setting a volume based on a torque, and setting a volume based on a vehicle speed. The vehicle driving sound parameters may be transmitted via communication between the user terminal and the controller. The communication between the user terminal and the controller may be performed using at least one selected from the group consisting of mobile communication, wireless local area network (LAN), near field communication, and a universal serial bus (USB) wired communication method. The user may select one from among at least one preset vehicle driving sound using the user terminal.

The vehicle may further include a driving state detection unit configured to detect a driving state of the vehicle, wherein the exciter may be configured to generate a vehicle driving sound based on the driving state of the vehicle. The driving state detection unit may include at least one selected from the group consisting of: a revolutions per minute (RPM) sensor, a torque sensor, a throttle position sensor, accelerator position sensors, and a wheel speed sensor.

According to another exemplary embodiment of the present invention, a vehicle control method may include receiving, by a controller, vehicle driving sound parameters requested by a user from a user terminal and vibrating, by the controller, a structure of a vehicle based on the vehicle driving sound parameters. The vehicle control method may further include setting, by the controller, the vehicle driving sound parameters requested by the user using the user terminal. The vehicle driving sound parameters may include at least one selected from the group consisting of: a volume and a tone of the vehicle driving sound and an accelerator pedal reactivity. The setting of the volume may include at least one selected from the group consisting of: setting, by the controller, a master volume, setting, by the controller, a volume based on an accelerator pedal reactivity, setting, by the controller, a volume based on a torque, and setting, by the controller, a volume based on a vehicle speed. The user may select one from among at least one preset vehicle driving sound using the user terminal.

The vehicle control method may further include detecting, by the controller, a driving state of the vehicle wherein an exciter may be operated by the controller to generate a vehicle driving sound based on the driving state of the vehicle. The detection of the driving state of the vehicle may include detecting at least one selected from the group consisting of: an engine revolution per minute (RPM) using an RPM sensor, an engine torque using a torque sensor, a throttle valve opening angle using a throttle position sensor, an accelerator pedal manipulation amount using accelerator position sensors, and a vehicle speed using a wheel speed sensor.

According to a further exemplary embodiment of the present invention, a vehicle driving sound control apparatus may include a user terminal that includes an application in which vehicle driving sound parameters may be set, a driving state detection unit configured to detect a driving state of a vehicle, an exciter configured to vibrate a structure of the vehicle, and a controller configured to receive vehicle driving sound parameters requested by a user from the user terminal, set a volume of the vehicle driving sound parameters, and operate the exciter to vibrate the structure of the vehicle based on the vehicle driving sound parameters. The controller may also be configured to operate the driving state detection unit. The structure of the vehicle vibrated by the exciter may be a structure disposed at a front side of a passenger compartment of the vehicle and may include a cowl panel. In addition, the structure may include a windshield at a front side of the passenger compartment.

The vehicle driving sound parameters may include at least one selected from the group consisting of: a volume and a tone of the vehicle driving sound and an accelerator pedal reactivity. The setting of the volume may include at least one selected from the group consisting of setting, by the controller, a master volume, setting, by the controller, a volume based on an accelerator pedal reactivity, setting, by the controller, a volume based on a torque, and setting, by the controller, a volume based on a vehicle speed. The vehicle driving sound parameters may be transmitted via communication between the user terminal and the controller. Communication between the user terminal and the controller may be performed using at least one selected from the group consisting of: mobile communication, wireless local area network (LAN), near field communication, and a USB wired communication method. The user may select one from among at least one preset vehicle driving sound via the user terminal. The driving state detection unit may include at least one selected from the group consisting of: an RPM sensor, a torque sensor, a throttle position sensor, accelerator position sensors, and a wheel speed sensor.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings, wherein like reference numerals refer to like elements throughout.

Figure 1:
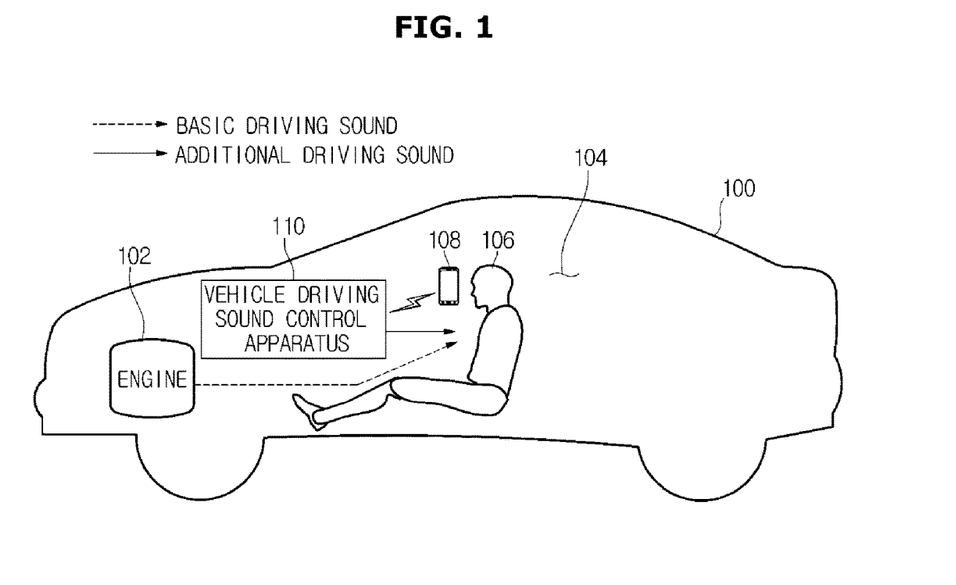
FIG. 1 is an exemplary view illustrating the concept of a vehicle driving sound control apparatus according to an exemplary embodiment of the present invention.

FIG. 1 is an exemplary view illustrating the concept of a vehicle driving sound control apparatus according to an exemplary embodiment of the present invention. As shown in FIG. 1, an engine 102 configured to generate driving force may be mounted within a vehicle 100. While the vehicle 100 is being driven, the engine 102 may be configured to generate an engine sound and the engine sound may be output into a passenger compartment 104. When the engine sound generated by the operating engine 102 of the driving vehicle 100 is a basic sound (e.g., a standard sound), the basic sound of the engine 102 may not suit the taste of a user 106.

In one exemplary embodiment of the present invention, the user 106 may set requested vehicle driving sound parameters (e.g., parameters to generate a desired vehicle driving sound) using an application loaded into a user terminal 108, and a vehicle driving sound control apparatus 110 may be configured to generate the requested vehicle driving sound based on the set vehicle driving sound parameters. The sound transmitted to the passenger compartment 104 may be a combination of the basic driving sound generated by the engine 102 and the additional driving sound generated by the vehicle driving sound control apparatus 110. A vehicle driving sound which will be stated hereinafter means an additional driving sound additionally generated by the vehicle driving sound control apparatus 110.

In FIG. 1, an operation the user terminal 108 to set the vehicle driving sound parameters may not be performed within the vehicle 100, and the user 106 located extraneous to the vehicle 100 may set the vehicle driving sound parameters by operating the user terminal 108. In particular, the user terminal 108 and the vehicle driving sound control apparatus 110 may be configured to communicate with each other using one of a plurality of communication methods that include wireless communication methods, such as mobile communication, wireless LAN and near field communication, and a USB wired communication method. For example, the user terminal 108 and the vehicle driving sound control apparatus 110 may be configured to communicate with each other using at least one selected from the group consisting of: second generation wireless telephone technology (2G), third generation wireless telephone technology (3G), and Long Term Evolution (LTE), wireless local area network (LAN) (e.g., Wi-Fi, near field communication, Bluetooth), and a USB wired communication method. In particular, the user terminal 108 may be a mobile communication terminal (e.g., a smart phone), a tablet, a tablet PC, a web pad, or a notebook. In addition, the user terminal may also be an Audio Video Navigation (AVN) disposed within a vehicle. In other words, a user may design driving sound using the AVN disposed within a vehicle.

Figure 2:
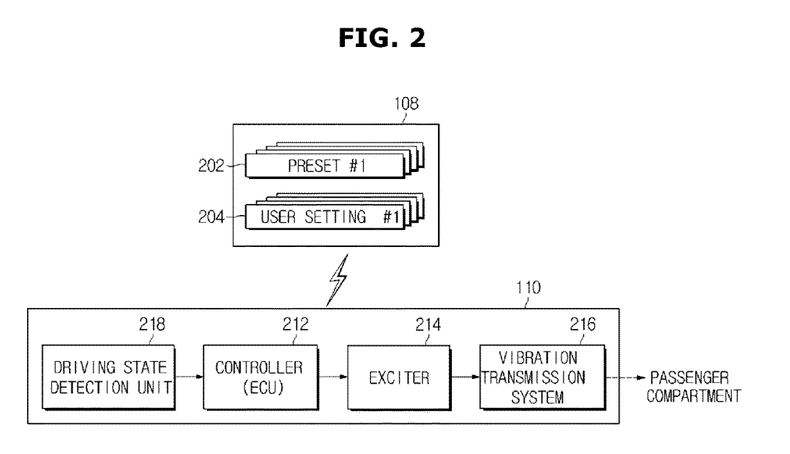
FIG. 2 is an exemplary view illustrating a control system of the vehicle driving sound control apparatus according to an exemplary embodiment of the present invention.

FIG. 2 is an exemplary view illustrating a control system of the vehicle driving sound control apparatus according to an exemplary embodiment of the present invention. As shown in FIG. 2, a user may set requested vehicle driving sound parameters using the application loaded into the user terminal 108 using at least two methods (e.g., a method that uses presets 202 and a method that uses user settings 204). In particular, the application of the user terminal 108 may be configured to provide a user interface (e.g., a graphical user interface) to set desired vehicle sound parameters using at least two methods.

In the method that uses presets 202, a manufacturer of the vehicle 100 may set vehicle driving sound parameters of specific forms in advance. By selecting a desired preset 202 using the application of the user terminal 108, the user 106 may generate a vehicle driving sound based on vehicle driving sound parameters of the corresponding preset 202. The method that uses user settings 204 allows the user to set a requested value as at least one vehicle driving sound parameter. The user 106 may generate a requested type vehicle driving sound by setting a requested value as at least one vehicle driving sound parameter using the application of the user terminal 108.

When vehicle driving sound parameters of a type desired by the user 106 are set, the set vehicle driving sound parameters may be transmitted from the user terminal 108 to a controller 212 of the vehicle driving sound control apparatus 110 via communication. The controller 212 (e.g., an electronic control unit (ECU) may be configured to communicate with a suspension system, a transmission system, a fuel supply system, a steering system, a braking system, a power supply system, an exhaust system, and a cooling system of the vehicle 100 and operate the respective systems of the vehicle 100. For example, when the controller 212 is an electronic control unit and a plurality of electronic control units, each of which is separately disposed in each of the above-described systems of the vehicle 100, are installed, the controller 212 and the electronic control units may be configured to communicate with each other, interact with each other, and operate the vehicle 100.

The controller 212 may be configured to receive vehicle driving sound parameters transmitted from the user terminal 108 and operates exciters 214 based on the received vehicle driving sound parameters. The exciters 214 may be configured to generate vibration of the vehicle. A vibration transmission system 216 may be configured to vibrate by driving the exciters 214 and generate waves in air, and the waves in air may be transmitted to the passenger compartment 104 of the vehicle 100 and may generate a sound. The exciter 214 may be at least one selected from the group consisting of: a mechanical exciter, an electronic exciter, and an electrohydraulic exciter. The sound generated within the passenger compartment 104 through the exciters 214 and the vibration transmission system 216 may be a sound based on the vehicle driving sound parameters set by the user 106 using the user terminal 108 (e.g., a vehicle driving sound that includes characteristics requested by the user 106).

When the user sets vehicle driving sound parameters using the application of the user terminal 108, the controller 212 may be configured to operate the exciters 214 based on the set vehicle driving sound parameters. In addition, the controller 212 may be configured to determine a driving state (e.g., a driving condition) of the vehicle 100 via a driving state detection unit 218 and adjust a driving degree of the exciters 214 based on the driving state of the vehicle 100, thus generating a vehicle driving sound based on the vehicle driving sound parameters set by the user 106 and the driving state of the vehicle 100.

The driving state detection unit 218 may include a plurality of sensors configured to detect operating states of various elements of the vehicle 100 at various positions of the vehicle 100. Operating state information of the various elements of the vehicle 100 detected by the sensors of the driving state detection unit 218 may be transmitted to the controller 212. The controller 212 may be configured determine the driving state of the vehicle 100 using the operating state information. In addition, the controller 212 may be configured to receive Engine Control Unit (ECU) information via a Control Area Network (CAN) communication, instead of using the driving state detection unit 218 as the driving state information of a vehicle.

Figure 3:
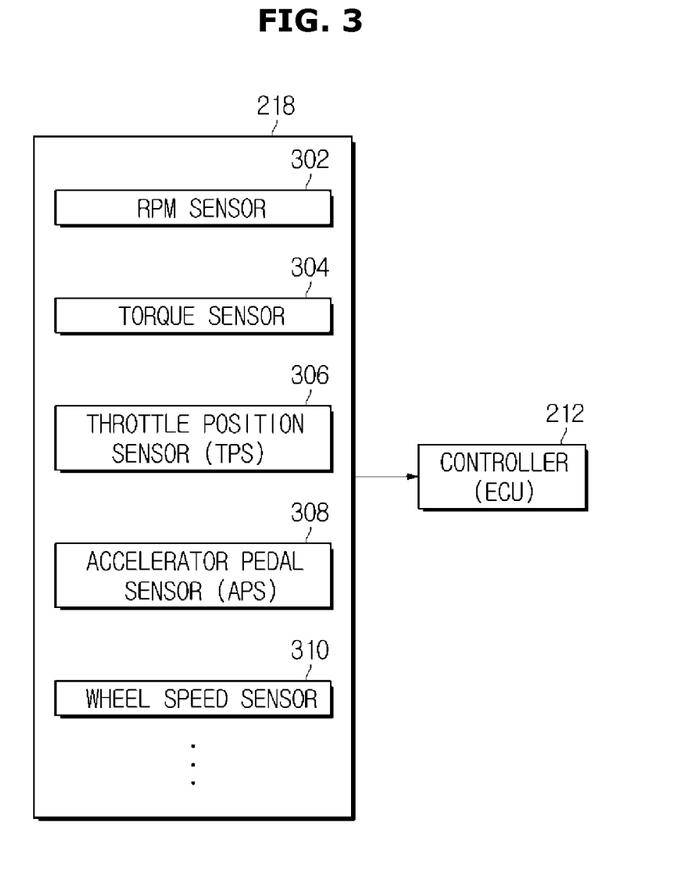
FIG. 3 is an exemplary view illustrating the constitution of a driving state detection unit according to an exemplary embodiment of the present invention.

Hereinafter, the plurality of sensors of the driving state detection unit 218 will be described in more detail with reference to FIGS. 3 to 5C. FIG. 3 is an exemplary a view illustrating the constitution of the driving state detection unit according to an exemplary embodiment of the present invention. As shown in FIG. 3, the driving state detection unit 218 may include a revolutions per minute (RPM) sensor 302, a torque sensor 304, a throttle position sensor 306, accelerator position sensors 308, and a wheel speed sensor 310.

The RPM sensor 302 may be configured to detect revolutions per minute (RPM) of the engine 102 and generate a pulse of a value that corresponds to the number of cylinders of the engine 102 per revolution of the engine 102. For example, in terms of the output pulse of the RPM sensor 302, an engine having 4 cylinders may generate 4 pulses per revolution, an engine having 6 cylinders may generate 6 pulses per revolution, and an engine having 3 cylinders may generate 3 pulses per revolution. The controller 212 may be configured to determine the RPM of the engine 102 using the number of pulses per minute generated by the RPM sensor 302.

The torque sensor 304 may be configured to detect torque of the engine 102. Further, the torque sensor 304 may be configured to determine a load degree of the engine 102. The throttle position sensor 306 may be configured to detect an opening angle of a throttle valve based on manipulation (e.g., acceleration) of an accelerator pedal by a driver. The throttle position sensor 306 may be a variable resistor rotated together with a throttle shaft of a throttle body and may be configured to detect the opening angle of the throttle valve. A resistance value of the throttle position sensor 306 may vary based on rotation of the throttle valve and thus output voltage of the throttle position sensor 396 may be changed. The controller 212 may be configured to determine the opening angle of the throttle valve using the change of the output voltage. The controller 212 may be configured to adjust a fuel injection amount by determining an operating mode of the engine 102 from the output voltage (e.g., the opening angle of the throttle valve) and the engine RPM. Further, the controller 212 may be configured to determine a driving control value of the exciters 214 based on the opening angle of the throttle valve and thus generate a proper vehicle driving sound based on the operating mode of the engine 102.

The accelerator position sensors 308 may be configured to detect a manipulation amount of the accelerator pedal. In other words, under the assumption that the manipulation amount of the accelerator pedal may be 0% when the accelerator pedal is disengaged and the manipulation amount of the accelerator pedal may be 100% when the user 106 fully engages the accelerator pedal is 100%, the manipulation degree (e.g., engagement degree) of the accelerator pedal by the user 106 may be determined to be a value between 0% and 100%. In particular, two accelerator position sensors 308 may form one set, one of the two accelerator position sensors 308 may be configured to detect the manipulation amount of the accelerator pedal, and the other of the two accelerator position sensors 308 may be configured to detect (e.g., monitor) a malfunction.

The wheel speed sensor 310 may be configured to detect the rotational speed of wheels of the vehicle 100. The controller 212 may be configure to receive detected values transmitted from the RPM sensor 302, the torque sensor 304, the throttle position sensor 306, the accelerator pedal sensors 308, and the wheel speed sensor 310 of the driving state detection unit 218 and thus, operate the vehicle 100. The driving state detection unit 218 may further include other sensors in addition to the RPM sensor 302, the torque sensor 304, the throttle position sensor 306, the accelerator pedal sensors 308, and the wheel speed sensor 310.

Figure 4:
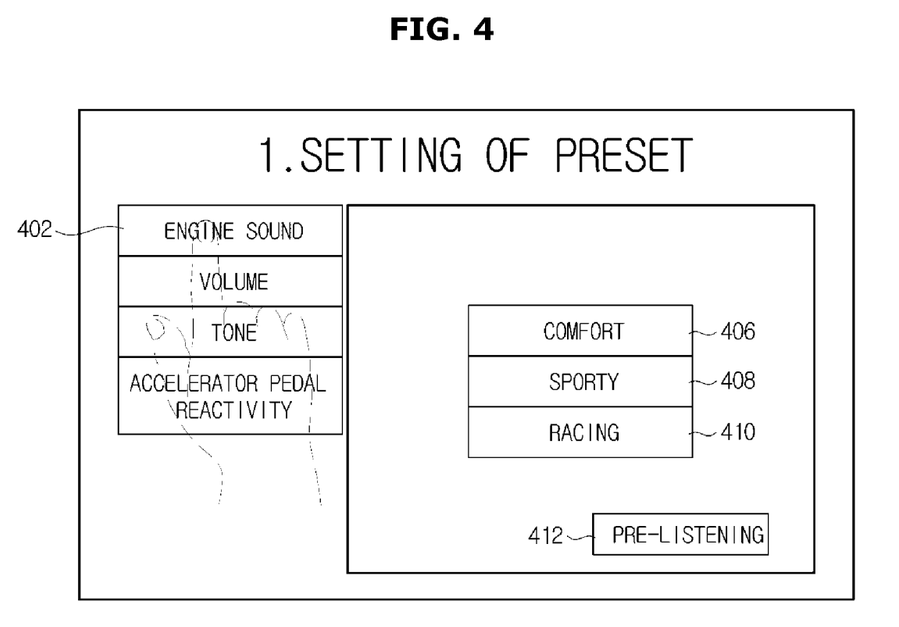
FIG. 4 is an exemplary view illustrating a preset picture for vehicle driving sound parameters through an application of a user terminal shown according to an exemplary embodiment of the present invention.

FIG. 4 is an exemplary view illustrating a preset picture for vehicle driving sound parameters through the application of the user terminal according to an exemplary embodiment of the present invention. The preset picture shown in FIG. 4 may be displayed on a touch type display of the user terminal 108 and may be operated using a cursor or a direction key when the display of the user terminal 108 is not a touch type display. As shown in FIG. 4, the preset picture displayed on the touch type display of the user terminal 108 may be displayed by touching an engine sound item 402 at a left portion of FIG. 4. When the user 106 touches the engine sound item 402, various predetermined types of vehicle driving sounds may be displayed at a right portion of FIG. 4. Although FIG. 4 illustrates when one from among three types of vehicle driving sounds (e.g., a comfort item 406, a sporty item 408, and a racing item 410) is selected, a type of vehicle driving sound may be selected from among a larger number of predetermined types of vehicle driving sounds. The comfort item 406 may represent a vehicle driving sound that may be generated in a safe and comfortable driving pattern and may be configured to generate a silent vehicle driving sound that excludes a sense of speed and considers comparatively frequent change of speed. The sporty item 408 may represent a vehicle driving sound in a more dynamic driving pattern than the comfort item 406 and may be configured generate a vehicle driving sound in a relatively higher engine RPM area. The racing item 410 may represent a vehicle driving sound in an extremely dynamic and extreme driving pattern and may be configured to generate a vehicle driving sound in an substantially high engine RPM area near a red zone (e.g., when the vehicle 100 is driven on a racing track).

The user 106 may select a desired one of the comfort item 406, the sporty item 408, and the racing item 410 via touch and thus generate a vehicle driving sound of the corresponding type may be generated. When the user 106 selects a desired type of vehicle driving sound, the user terminal 108 may be configured transmit vehicle driving sound parameters based on the selected type to the controller 212 to generate a corresponding vehicle driving sound.

In FIG. 4, a pre-listening item 412 may be configured to generate a vehicle driving sound that corresponds to the item selected by the user 106 for a minimal amount of time of about 3 to about 5 seconds to allow the user 106 to recognize the type of the corresponding vehicle driving sound in advance. In other words, a sample of the item selected may be generated to ensure the selected item is one requested by the driver. The vehicle driving sound generated for pre-listening may be generated by operating the exciters 214 or output using speakers of the vehicle 100 or a speaker of the user terminal 108 by reproducing a digital sound source which has been provided in advance.

Accordingly, the user 106 may not recognize which profile each item has, and the corresponding vehicle driving sound may be more conveniently generated simply by listening to a reproduced pre-listening sound and selecting an item that corresponds to a sound requested by the user 106. However, in the pre-listening item 412, to generate a vehicle driving sound for pre-listening by operating the exciters 214, the vehicle 100 may need to be in a start-up state (e.g., the vehicle is running) to supply power to the interior of the vehicle 100 and to operate the engine 102.

Figure 5A:
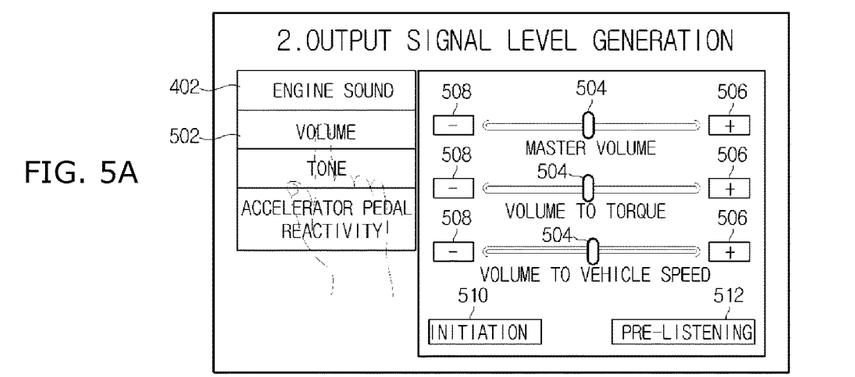
FIGS. 5A to 5C are exemplary views illustrating user setting for vehicle driving sound parameters through the application of the user terminal according to an exemplary embodiment of the present invention.
Figure 5B:
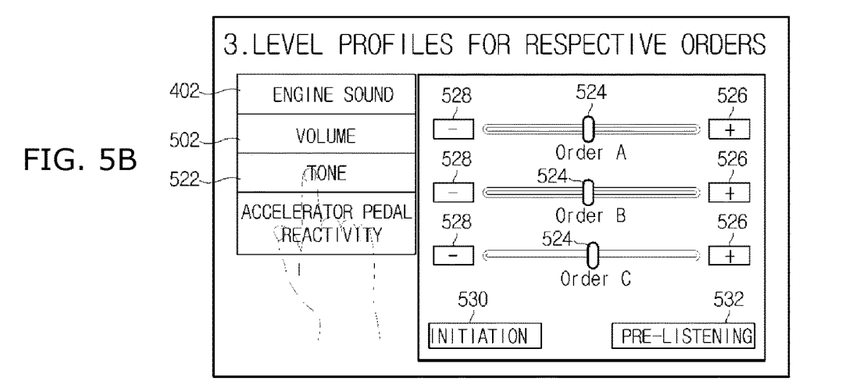
Figure 5C:
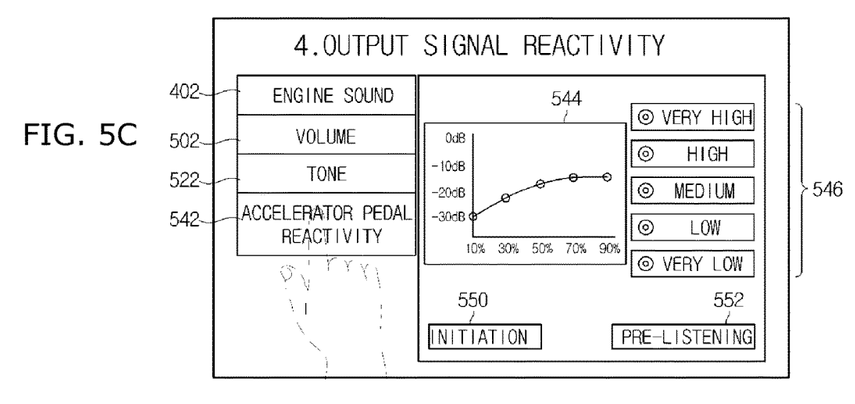

FIGS. 5A to 5C are exemplary views illustrating user setting for vehicle driving sound parameters through the application of the user terminal according to an exemplary embodiment of the present invention. In an application to control a vehicle driving sound according to an exemplary embodiment of the present invention, a user may adjust a volume, a tone, and an accelerator pedal reactivity of a desired vehicle driving sound.

As shown in FIG. 5A, an output signal level generation picture displayed on the touch type display of the user terminal 108 may be displayed by touching a volume item 502 located at the left portion of the picture. When the user 106 touches the volume item 502, slide bars 504 configured to adjust volume may be displayed at the right portion of the picture. When the slide bar 504 is dragged in the positive direction (+) 506, the volume of the vehicle driving sound may increase, and alternatively, when the slide bar 504 is dragged in the negative direction (−) 508, the volume of the vehicle driving sound may decrease.

Setting of volume may be divided into setting of a master volume, setting a volume based on accelerator pedal reactivity, setting a volume based on torque, and setting a volume based on vehicle speed. The master volume may be configured to allow the user 106 to set the volume of a vehicle driving sound to a desired volume, and the volume of the vehicle driving sound may be determined based on a value set by the user 106.

The volume based on a torque may be configured increase or decrease the volume of the vehicle driving sound based on torque generated by the engine 102 of the vehicle 100. The volume is set based on torque to a minimal value, a variation of volume may be less than a variation of torque and, alternatively, when the volume is set based on torque to a substantially high value, and volume may vary substantially even during a minimal variation of torque. Further, setting the volume based on a torque as described above may provide a more dynamic vehicle driving sound even during a minimal variation of torque.

The volume based on vehicle speed may be configured to increase or decrease the volume of the vehicle driving sound based on the driving speed of the vehicle. When the user 106 sets the volume based on vehicle speed to a minimal value, a variation of volume may be less than a variation of a vehicle speed and, alternatively, when the user 106 sets the volume based on vehicle speed to a substantially high value, volume may vary substantially even during a minimal variation of the vehicle speed. Setting the volume based on a vehicle speed as described above may provide a more dynamic vehicle driving sound even during minimal acceleration. Setting of volume is not limited to setting of the three types of volumes and volume may be set in consideration of other characteristics.

Initialization 510 may be used to return the slide bars 504 to initial values (e.g., median values). With reference to FIG. 5A, a pre-listening item 512 may be configured to generate a vehicle driving sound that corresponds to the volume set by the user 106 for a minimal period of time of about 3 to about 5 seconds to allow the user 106 to recognize the volume of the that corresponds vehicle driving sound in advance. The vehicle driving sound generated for pre-listening may be generated by operating the exciters 214 or output using the speakers of the vehicle 100 or the speaker of the user terminal 108 by reproducing a digital sound source which has been disposed in advance. Accordingly, the user 106 may more conveniently confirm the volume of the vehicle driving sound requested by the user 106 in advance. However, in the pre-listening item 512, to generate a vehicle driving sound for pre-listening by operating the exciters 214, the vehicle 100 may need to be in a start-up state so as to supply power to the interior of the vehicle 100 and to operate the engine 102.

As shown in FIG. 5B, a level profile picture for respective orders displayed on the touch type display of the user terminal 108 may be displayed by touching a tone item 522 located at the left portion of the picture. When the user 106 touches the tone item 522 on the picture displayed on the display of the user terminal 108, a plurality of slide bars 524 used to individually adjust levels of an engine sound based on respective orders may be displayed at the right portion of the picture. When the slide bar 524 of a particular order is dragged in the positive direction (+) 526, the level of the vehicle driving sound in the corresponding order may increase, and alternatively, when the slide bar 524 of the particular order is dragged in the negative direction (−) 528, the level of the vehicle driving order in the corresponding order may decrease. By adjusting the levels of the engine sound based the respective orders in such a manner, a vehicle driving sound that has various tones rather than a fixed tone may be generated. Initialization 530 may be used to return the slide bars 524 of the respective orders to initial values (e.g., median values).

With reference to FIG. 5B, a pre-listening item 532 may be configured to generate a vehicle driving sound in which the levels in the respective orders set by the user 106 may be reflected for a minimal period of time of about 3 to about 5 seconds to allow the user 106 to recognize the tones of the corresponding vehicle driving sound in advance. The vehicle driving sound generated for pre-listening may be generated by operating the exciters 214 or output using the speakers of the vehicle 100 or the speaker of the user terminal 108 by reproducing a digital sound source which has been provided in advance. Accordingly, the user 106 may more conveniently confirm the tones of the vehicle driving sound selected by the user 106 in advance. However, in the pre-listening item 532, to generate a vehicle driving sound for pre-listening by operating the exciters 214, the vehicle 100 may need to be in a start-up state to supply power to the inside of the vehicle 100 and to operate the engine 102.

As shown in FIG. 5C, an output signal reactivity picture displayed on the touch type display of the user terminal 108 may be displayed by touching an accelerator pedal reactivity item 542 located at the left portion of the picture. When the user 106 touches the accelerator pedal reactivity item 542, a picture to set a gain of a vehicle driving sound to a manipulation amount (unit of %) of the accelerator pedal may be displayed at the right portion of the picture. In a graph 544 visually displaying reactivity, the horizontal axis may represent the manipulation amount (%) of the accelerator pedal in the unit of 10%-30%-50%-70%-90% and the vertical axis may represent the gain of the vehicle driving sound at regular intervals from about −30 decibels (dB) to 0 dB. Reactivity level items 546 may include substantially high-high-medium-low-substantially low.

When an accelerator pedal manipulation amount of a specific percentage is selected and a desired value is selected from among the reactivity level items 546, a gain of the selected value to the accelerator pedal manipulation amount of the corresponding percentage may be set. When gains to all the accelerator pedal manipulation amounts of 10%-30%-50%-70%-90% are set in such a manner, output signal reactivity of a type desired by the user 106 may be set. As shown in FIG. 5C, output signal reactivity may rapidly change when the accelerator pedal manipulation amount is between about 10% and about 50% and thus, a comparatively rapid response may be acquired at the initial manipulation stage of the accelerator pedal, and output signal reactivity in a rear section of the accelerator pedal manipulation amount after 50% may be minimally changed and thus, a comparatively slow response may be acquired in this section. In other words, when the accelerator pedal is minimally manipulated, a rapid response of the output signal (e.g., vehicle driving sound) may be acquired.

With reference to FIG. 5C, a pre-listening item 552 may be configured to generate a vehicle driving sound in which output signal reactivity set by the user 106 is reflected for a minimal period of time of about 3 to about 5 seconds to allow the user 106 to recognize reactivity of the corresponding vehicle driving sound in advance. Accordingly, the user 106 may manipulate the accelerator pedal of the vehicle 100, or a virtual accelerator pedal may be implemented on an image of the application of the user terminal 108 and a virtual vehicle driving sound may be generated to allow the user 106 to recognize output signal reactivity whenever the virtual accelerator pedal is manipulated by touch. The vehicle driving sound generated for pre-listening may be generated by operating the exciters 214 or output using the speakers of the vehicle 100 or the speaker of the user terminal 108 by reproducing a digital sound source which has been provided in advance. Therefore, the user 106 may more conveniently confirm reactivity of the vehicle driving sound selected by the user 106 in advance. However, in the pre-listening item 552, to generate a vehicle driving sound for pre-listening by directly driving the exciters 214, the vehicle 100 may need to be in a start-up state to supply power to the inside of the vehicle 100 and to operate the engine 102.

Referring to FIG. 2, when the user 106 sets vehicle driving sound parameters using the application of the user terminal 108, the controller 212 may be configured to operate the exciters 214 based on the set vehicle driving sound parameters. In particular, the controller 212 may be configured to determine a driving state (e.g., a driving condition) of the vehicle 100 via the driving state detection unit 218 and adjust a driving degree of the exciters 214 based on the driving state of the vehicle 100.

Figure 6:
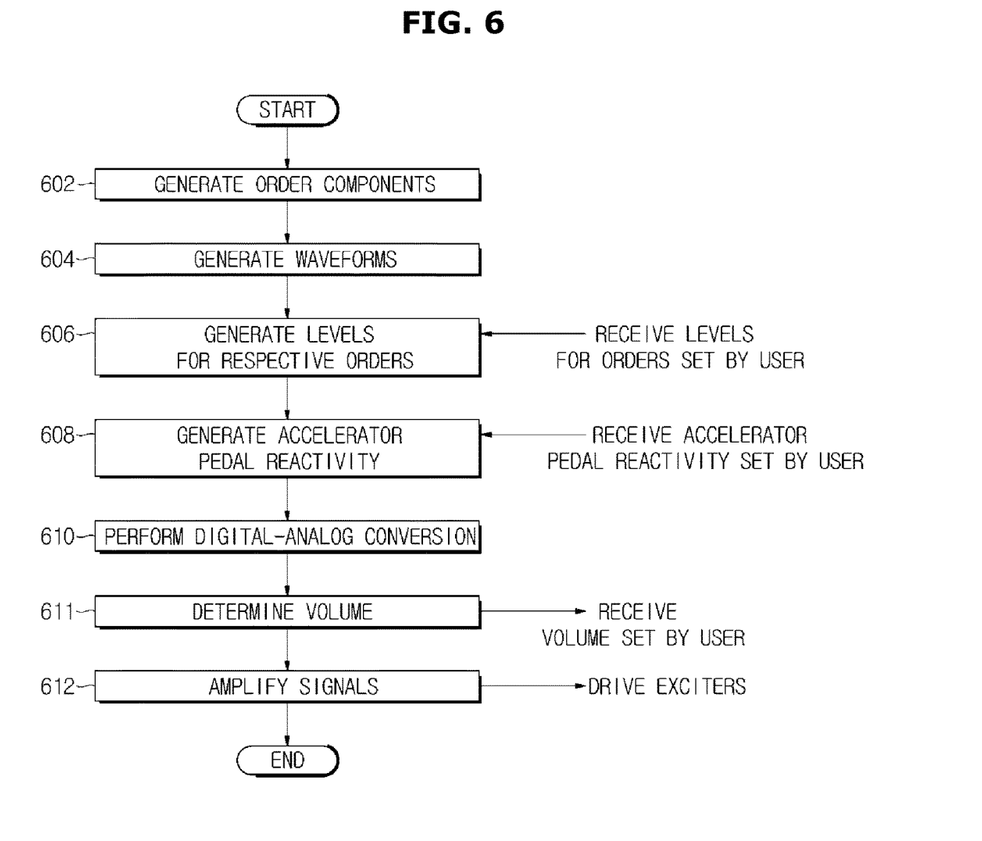
FIG. 6 is an exemplary flowchart illustrating a process of generating a control signal to operate exciters according to an exemplary embodiment of the present invention.

FIG. 6 is an exemplary flowchart illustrating a process of generating a control signal to operate the exciters 214. As shown in FIG. 6, the controller 212 may be configured to generate a control signal to operate the exciters 214 using a series of processes, such as generation of order components (Operation 602), generation of waveforms (Operation 604), generation of levels for respective orders (Operation 606), generation of accelerator pedal reactivity (Operation 608), digital-analog conversion (Operation 610), setting of volume (Operation 611), and signal amplification (Operation 612).

In the generation of order components (Operation 602), respective order components of harmonic signals of various orders based on RPM of the engine 102 may be generated. In the generation of waveforms (Operation 604), current waveforms of output signals based on order target values may be generated based on a vehicle transfer function and order target values based on the vehicle transfer function. In the generation of levels for respective orders (Operation 606), level values for respective orders may be generated by employing level profiles for the orders set by the user, as shown in FIG. 5B.

Further, in the generation of accelerator pedal reactivity (Operation 608), accelerator pedal reactivity may be generated by employing output signal reactivity set by the user, as shown in FIG. 5C. In the digital-analog conversion (Operation 610), digital-analog conversion may convert a digital control value generated in Operations 602 to 608 into an analog signal to actually operate the exciters 214. In the setting of the volume (Operation 611), a volume e.g., the volume of the vehicle driving sound) may be determined based user setting of master volume, volume based on torque, and volume based on vehicle speed. The converted analog signal may not be sufficient to operate the exciters 214 and is thus amplified via signal amplification (Operation 612) to operate the exciters 214. In the signal amplification (Operation 612), volume set values determined during setting of volume (Operation 611) may be reflected.

Figure 7:
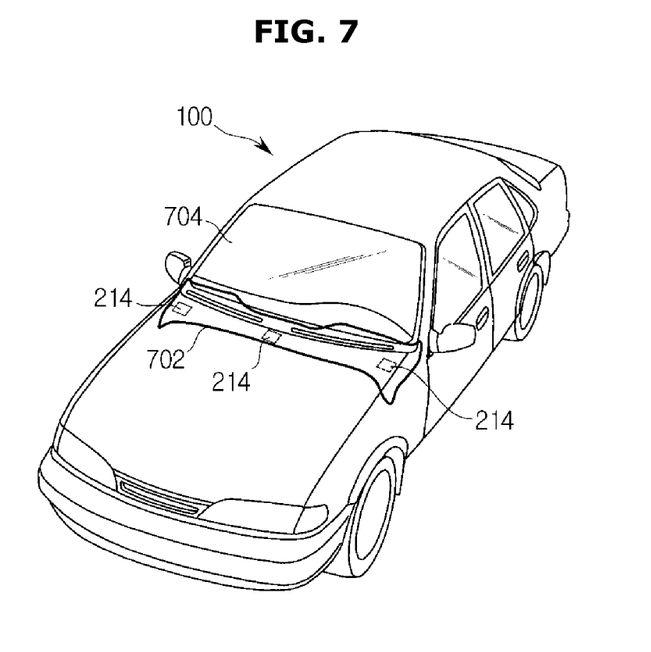
FIG. 7 is an exemplary view illustrating exciters and a vibration transmission system according to an exemplary embodiment of the present invention.

FIG. 7 is an exemplary view illustrating exciters and a vibration transmission system according to an exemplary embodiment of the present invention. The vehicle driving sound control apparatus 110 may be configured to vibrate a vibration transmission system 216 of the vehicle 100 using the exciters 214, thus generating a vehicle driving sound of a requested type. In particular, the vibration transmission system 216 may be a structure of the vehicle 100. As shown in FIG. 7, a cowl panel 702 (e.g. cowl side panel or cowl top cover) or a windshield 704 at a front surface of the vehicle 100 may be used as the vibration transmission system 216.

The cowl panel 702 may be a panel that connects a dashboard and a front filler of the vehicle 100 and may be connected to the lower end of the windshield 704. When at least one exciter (e.g., a plurality of exciters) 214 is installed on the cowl panel 702 and operated, the exciter 214 may be configured to vibrate the cowl panel 702 and the windshield 704 and generate a requested vehicle driving sound.

In the vehicle driving control apparatus 110, the vibration transmission system 216 is not limited to the cowl panel 702 or the windshield 704 and may be one of other structures of the vehicle 100. However, the cowl panel 702 and the windshield 704 may be located in a front part of a driving space (e.g., at the front portion of the vehicle 100) and thus, a vehicle driving sound generated by the cowl panel 702 and the windshield 704, when the vehicle 100 is driven, may be transmitted to a rear portion (e.g., back) of the vehicle 100.

Figure 8:
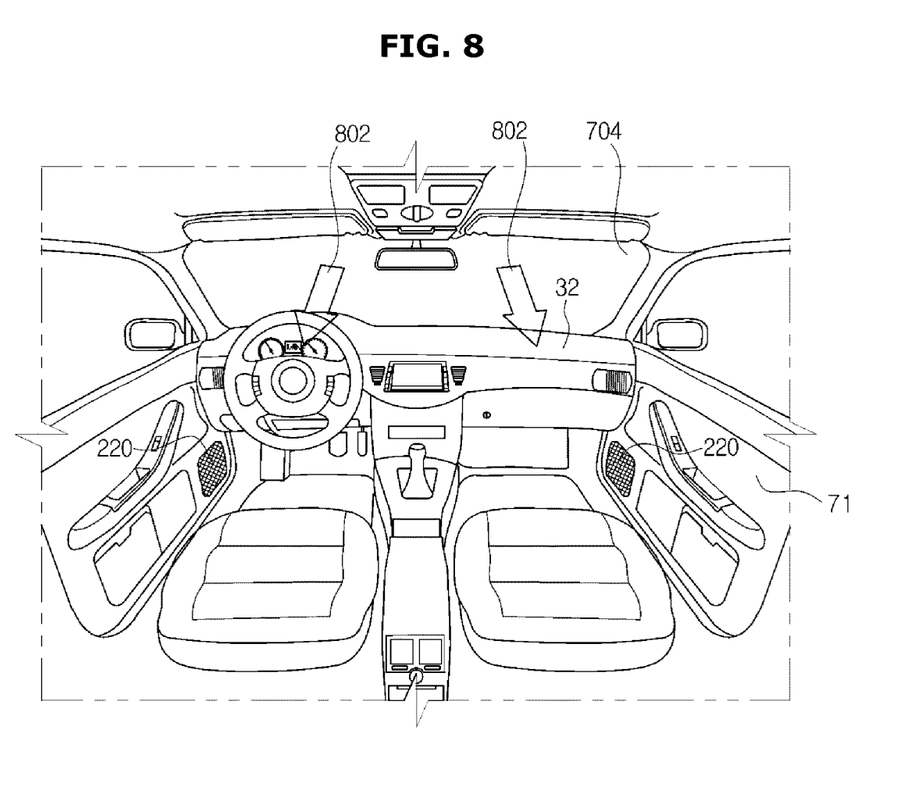
FIG. 8 is an exemplary view illustrating the inside of a vehicle according to an exemplary embodiment of the present invention.

FIG. 8 is an exemplary view illustrating the inside of a vehicle according to one exemplary embodiment of the present invention. As shown in FIG. 8, since a vehicle driving sound 802 generated due to vibration of a cowl panel 214, which may be shielded by a dashboard 32, and a windshield 704, disposed at a rear of the dashboard 32, may be transmitted from the front portion to the rear portion of the vehicle 100, a passenger may feel the vehicle driving sound 802 similar to an actual engine sound. However, when a vehicle driving sound in the form of a digital sound source is output through speakers 220, the vehicle driving sound may be output from the side surfaces of the vehicle 100 to a passenger and thus, reality of such a vehicle driving sound may be less than reality of the vehicle driving sound transmitted from the front portion to the rear portion of the vehicle. Accordingly, a vehicle driving sound may be generated by vibrating a structure of the vehicle, and more particularly, a vehicle driving sound may be generated by vibrating a structure located in a front part of the passenger compartment (e.g., the cowl panel 702 and the windshield 704).

Figure 9:
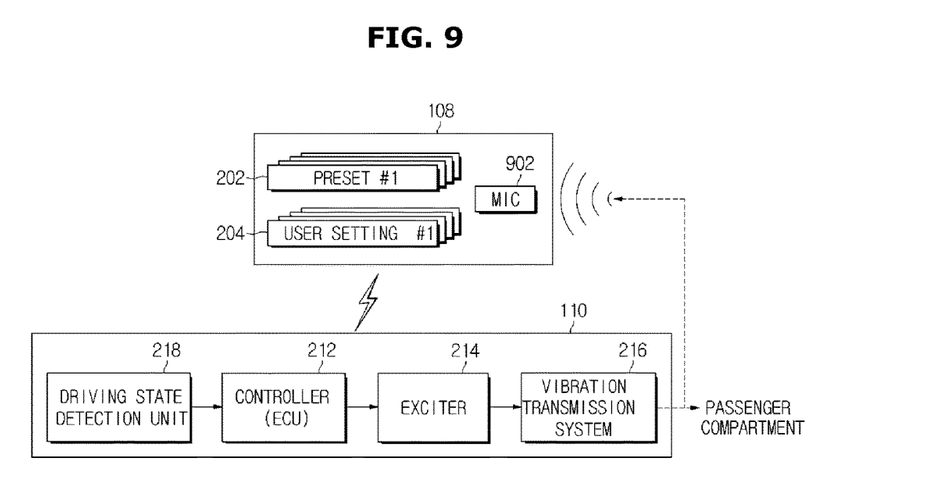
FIG. 9 is an exemplary view illustrating a control system of a vehicle driving sound control apparatus according to an exemplary embodiment of the present invention.

FIG. 9 is an exemplary view illustrating a control system of a vehicle driving sound control apparatus according to an exemplary embodiment of the present invention. As shown in FIG. 9, a user may set requested vehicle driving sound parameters using the application loaded in the user terminal 108 using at least two methods (e.g., a method of using presets 202 and a method of using user settings 204). In particular, the application of the user terminal 108 may provide a user interface (e.g., a graphical user interface) to set the requested vehicle sound parameters via at least two methods.

In the method of using presets 202, a manufacturer of the vehicle 100 may set specific type vehicle driving sound parameters in advance. Simply by selecting a desired preset 202 using the application of the user terminal 108, the user 106 may generate a vehicle driving sound based on vehicle driving sound parameters of the corresponding preset 202. The method of using user settings 204 may allow the user to set a desired value as at least one vehicle driving sound parameter. The user 106 may generate a vehicle driving sound of a requested type by setting a requested value as at least one vehicle driving sound parameter using the application of the user terminal 108.

When the user 106 generates a requested type vehicle driving sound, when the level of the vehicle driving sound (e.g., additional sound) is less than the level of an engine sound (e.g. basic sound) generated by the engine 102, the engine sound may need to be attenuated. In particular, information of a sound actually transmitted to the passenger compartment 104 may be acquired, the level of the sound may be compared with the level of the requested vehicle driving sound, and the sound may be when needed. A microphone may be used as a sound acquisition unit configured to acquire the level of the sound actually transmitted to the passenger compartment 104. When a separate microphone is disposed within the passenger compartment 104, costs may increase and the microphone may be damaged during cleaning in the vehicle 100.

In the vehicle driving sound control apparatus, as shown in FIG. 9, a microphone 902 disposed within the user terminal 108 may be used instead of installation of a separate microphone. In particular, installation of a separate microphone may be omitted and thus may reduce costs, and the microphone may not be damaged during cleaning the passenger compartment 104.

When vehicle driving sound parameters of a type requested by the user 106 are set using presets 202 or user settings 204, the set vehicle driving sound parameters may be transmitted from the user terminal 108 to the controller 212 via communication. The controller 212 may be configured to communicate with a suspension system, a transmission system, a fuel supply system, a steering system, a braking system, a power supply system, an exhaust system, and a cooling system of the vehicle 100 and thus operate the respective systems of the vehicle 100. For example, when the controller 212 is an electronic control unit and a plurality of electronic control units, each of which is separately provided in each of the above-described systems of the vehicle 100, are installed, the controller 212 and the electronic control units may be configured to communicate with each other operate the vehicle 100.

The controller 212 may be configured to receive vehicle driving sound parameters transmitted from the user terminal 108 and operate exciters 214 based on the received vehicle driving sound parameters. The exciters 214 may be configured to generate vibration. A vibration transmission system 216 may be configured to be vibrated by the operation of the exciters 214 and generate waves in air, and the waves in air may be transmitted to the passenger compartment 104 of the vehicle 100 and generate a sound. The exciter 214 may be one selected from the group consisting of: a mechanical exciter, an electronic exciter, and an electrohydraulic exciter. The sound generated in the passenger compartment 104 via the exciters 214 and the vibration transmission system 216 may be a sound that reflects the vehicle driving sound parameters set through the application of the user terminal 108 by the user 106.

When the user sets vehicle driving sound parameters, the controller 212 may be configured to operate the exciters 214 based on the set vehicle driving sound parameters. In addition, the controller 212 may be configured determine a driving state (e.g., a driving condition) of the vehicle 100 via the driving state detection unit 218 and adjust an operation degree of the exciters 214 based on the driving state of the vehicle 100, which may generate a vehicle driving sound of a type based on sound parameters set by the user 106 and the driving state of the vehicle 100. The driving state detection unit 218 may include a plurality of sensors configured to detect operating states of various elements of the vehicle 100 at various positions of the vehicle 100. Operating state information of the various elements of the vehicle 100 detected by the sensors of the driving state detection unit 218 may be transmitted to the controller 212. Accordingly, the controller 212 may be configured to determine the driving state of the vehicle 100 using such operating state information.

As is apparent from the above description, a vehicle, a vehicle control method, and a vehicle driving sound control apparatus according to an exemplary embodiment of the present invention may generate a vehicle driving sound requested by a user using a user terminal and vibrate a structure of the vehicle using exciters to generate an additional driving sound more similar to an actual vehicle driving sound.

Although exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A vehicle, comprising:
   an exciter configured to vibrate a structure of the vehicle, the vibrated structure of the vehicle including at least one of a cowl panel and a windshield; and
   a controller configured to:
      receive vehicle driving sound parameters; and
      operate the exciter to vibrate the structure of the vehicle based on the vehicle driving sound parameters, thereby generating a vehicle driving sound that corresponds to the vehicle driving sound parameters,
   wherein
      the vehicle driving sound is generated by the vibration of the structure of the vehicle, the structure being disposed in a front part of a passenger compartment of the vehicle, and
      the exciter is distinct from the structure of the vehicle.

2. The vehicle according to claim 1, wherein the vehicle driving sound parameters requested by a user are set using a user terminal.

3. The vehicle according to claim 2, wherein the vehicle driving sound parameters include at least one selected from the group consisting of: a volume of the vehicle driving sound, a tone of the vehicle driving sound, and an accelerator pedal reactivity.

4. The vehicle according to claim 3, wherein the setting of the volume includes at least one selected from the group consisting of: setting a master volume, setting a volume based on accelerator pedal reactivity, setting a volume based on torque, and setting a volume based on vehicle speed.

5. The vehicle according to claim 2, wherein the vehicle driving sound parameters are transmitted via communication between the user terminal and the controller.

6. The vehicle according to claim 5, wherein communication between the user terminal and the controller is executed using at least one selected from the group consisting of: mobile communication, wireless local area network (LAN), near field communication, and a universal serial bus (USB) wired communication method.

7. The vehicle according to claim 1, wherein the controller is further configured to:
   output a preset vehicle driving sound when one from among at least one preset vehicle driving sound is selected using the user terminal.

8. The vehicle according to claim 1, wherein the controller is further configured to:
   determine a driving state of the vehicle using a driving state detection unit,
   wherein the exciter is operated to generate a vehicle driving sound that corresponds to the driving state of the vehicle.

9. The vehicle according to claim 8, wherein the driving state detection unit includes at least one selected from the group consisting of: a revolutions per minute (RPM) sensor, a torque sensor, a throttle position sensor, accelerator position sensors, and a wheel speed sensor.

10. A vehicle control method, comprising:
receiving, by a controller, vehicle driving sound parameters; and
operating, by the controller, an exciter to vibrate a structure of a vehicle, the vibrated structure of the vehicle including at least one of a cowl panel and a windshield, based on the vehicle driving sound parameters, thereby generating a vehicle driving sound that corresponds to the vehicle driving sound parameters, wherein
the vehicle driving sound is generated by the vibration of the structure of the vehicle, the structure being disposed in a front part of a passenger compartment of the vehicle, and
the exciter is distinct from the structure of the vehicle.

11. The vehicle control method according to claim 10, further comprising:
setting, by the controller, vehicle driving sound parameters requested by a user using a user terminal.

12. The vehicle control method according to claim 11, wherein the vehicle driving sound parameters include at least one selected from the group consisting of: a volume of the vehicle driving sound, a tone of the vehicle driving sound, and an accelerator pedal reactivity.

13. The vehicle control method according to claim 12, wherein the setting of the volume includes at least one selected from the group consisting of: setting a master volume, setting a volume based on accelerator pedal reactivity, setting a volume based on torque, and setting a volume based on vehicle speed.

14. The vehicle control method according to claim 10, further comprising:
outputting, by the controller, a preset vehicle driving sound when one from among at least one preset vehicle driving sound is selected using the user terminal.

15. The vehicle control method according to claim 10, further comprising:
detecting, by the controller, a driving state of the vehicle, wherein the exciter is operated to generate a vehicle driving sound that corresponds to the driving state of the vehicle.

16. The vehicle control method according to claim 15, wherein the detection of the driving state of the vehicle includes detecting at least one selected from the group consisting of: an engine revolutions per minute (RPM) using an RPM sensor, an engine torque using a torque sensor, a throttle valve opening angle using a throttle position sensor, an accelerator pedal manipulation amount using accelerator position sensors, and a vehicle speed using a wheel speed sensor.

17. A vehicle driving sound control apparatus, comprising:
a user terminal that includes an application in which vehicle driving sound parameters are set;
an exciter configured to vibrate a structure of a vehicle, the vibrated structure of the vehicle including at least one of a cowl panel and a windshield; and
a controller configured to:
receive the vehicle driving sound parameters from the user terminal;
detect a drive state of the vehicle using a driving state detection unit; and
operate the exciter to vibrate the structure of the vehicle based on the vehicle driving sound parameters, thereby generating a vehicle driving sound that corresponds to the vehicle driving sound parameters, wherein
the vehicle driving sound is generated by the vibration of the structure of the vehicle, the structure being disposed in a front part of a passenger compartment of the vehicle, and
the exciter is distinct from the structure of the vehicle.

18. The vehicle driving sound control apparatus according to claim 17, wherein the vehicle driving sound parameters include at least one selected from the group consisting of: a volume of the vehicle driving sound, a tone of the vehicle driving sound, and an accelerator pedal reactivity.

19. The vehicle driving sound control apparatus according to claim 18, wherein the setting of the volume includes at least one selected from the group consisting of: setting a master volume, setting a volume based on accelerator pedal reactivity, setting a volume based on torque, and setting a volume based on vehicle speed.

20. The vehicle driving sound control apparatus according to claim 17, wherein the vehicle driving sound parameters are transmitted via communication between the device and the controller.

21. The vehicle driving sound control apparatus according to claim 20, wherein communication between the device and the controller is executed using at least one selected from the group consisting of: mobile communication, wireless LAN, near field communication, and a USB wired communication method.

22. The vehicle driving sound control apparatus according to claim 17, wherein the controller is further configured to:
output a preset vehicle driving sound when one from among at least one preset vehicle driving sound is selected using the device.

23. The vehicle driving sound control apparatus according to claim 17, wherein the driving state detection unit includes at least one selected from the group consisting of: a revolutions per minute (RPM) sensor, a torque sensor, a throttle position sensor, accelerator position sensors, and a wheel speed sensor.

* * * * *